United States Patent
Högele et al.

(10) Patent No.: US 9,766,443 B2
(45) Date of Patent: Sep. 19, 2017

(54) VARIOSCOPE OPTICAL UNIT AND MICROSCOPE HAVING A VARIOSCOPE OPTICAL UNIT

(71) Applicant: Carl Zeiss Meditec AG, Jena (DE)

(72) Inventors: Artur Högele, Oberkochen (DE); Jürgen Liegel, Oberkochen (DE); Fenny Nauli, Oberkochen (DE)

(73) Assignee: CARL ZEISS MEDITEC AG, Jena (DE)

( * ) Notice: Subject to any disclaimer, the term of this patent is extended or adjusted under 35 U.S.C. 154(b) by 0 days.

(21) Appl. No.: 13/855,039

(22) Filed: Apr. 2, 2013

(65) Prior Publication Data

US 2013/0258458 A1   Oct. 3, 2013

(30) Foreign Application Priority Data

Apr. 3, 2012 (DE) ................. 10 2012 102 902

(51) Int. Cl.
  *G02B 21/00* (2006.01)
  *G02B 21/02* (2006.01)
  *G02B 21/22* (2006.01)

(52) U.S. Cl.
  CPC ....... *G02B 21/025* (2013.01); *G02B 21/0012* (2013.01); *G02B 21/22* (2013.01)

(58) Field of Classification Search
  CPC ...... G02B 21/025; G02B 13/02; G02B 15/12; G02B 21/0032; G02B 21/0076; G02B 21/22; G02B 23/10; G02B 27/34
  (Continued)

(56) References Cited

U.S. PATENT DOCUMENTS 3,975,087 A * 8/1976 Shoemaker ............ G02B 21/02
                                              359/661
4,871,245 A * 10/1989 Ishikawa .............. G02B 21/082
                                              359/363
(Continued)

FOREIGN PATENT DOCUMENTS

AT        238 961       3/1965
CN       1525142        9/2004
(Continued)

OTHER PUBLICATIONS

German Office Action of May 16, 2012.
First Notification of Examiner's Opinion (Chinese family member of U.S. Appl. No. 13/855,039) Dated Apr. 12, 2016.

*Primary Examiner* — Stephone B Allen
*Assistant Examiner* — Rahman Abdur
(74) *Attorney, Agent, or Firm* — Nixon Peabody LLP; Jeffrey L. Costellia

(57) ABSTRACT

A varioscope optical unit has a positive member (9) with a positive refractive power and a negative member (11) with a negative refractive power arranged along an optical axis (OA) so that the negative member follows the positive member along an observation direction (B). At least one of the members is displaceable along the optical axis. Each member has a first termination lens surfaces (23, 27) counter to the observation direction (B) and second termination lens surface (25, 29) in the observation direction. The second termination lens surface of the positive member and the first termination lens surface of the negative member are concave when viewed in the observation direction (B) and have radii of curvature of at most 500 mm. The second termination lens surface of the negative member is convex when viewed in the observation direction (B) and has a radius of curvature of at most 70 mm.

17 Claims, 4 Drawing Sheets

(58) Field of Classification Search
USPC .................................. 359/380, 362, 391–392
See application file for complete search history.

(56) References Cited

U.S. PATENT DOCUMENTS

| | | | |
|---|---|---|---|
| 8,144,394 B2 * | 3/2012 | Uzawa | G02B 21/025 359/377 |
| 2001/0026366 A1 * | 10/2001 | Nomura | G01B 11/27 356/401 |
| 2004/0057108 A1 | 3/2004 | Namii | |
| 2004/0156098 A1 * | 8/2004 | Dubois | G01N 21/6458 359/368 |
| 2005/0174665 A1 | 8/2005 | Zhang et al. | |
| 2007/0002323 A1 * | 1/2007 | Fukui | G03F 9/7088 356/401 |
| 2009/0296206 A1 | 12/2009 | Uzawa | |

FOREIGN PATENT DOCUMENTS

| | | |
|---|---|---|
| DE | 19523712 | 1/1996 |
| GB | 978 816 | 12/1964 |
| JP | 11-271625 | 10/1999 |

* cited by examiner

| Nr | Radius [mm] | Thickness 1 [mm] | Thickness 2 [mm] | Diameter [mm] | Medium | Refractive index at 546 mm | Abbe number |
|---|---|---|---|---|---|---|---|
| F1 | 79,80 | 6,60 |  | 40,00 | CAF2 | 1,4349 | 94,46 |
| F2 | -64,00 | 2,00 |  | 40,00 | KZFS8 | 1,7254 | 34,39 |
| F3 | -133,00 | 0,20 |  | 40,00 | AIR |  |  |
| F4 | 120,00 | 3,00 |  | 40,00 | CAF2 | 1,4349 | 94,46 |
| F5 | -470,00 | 13,00 | 2,00 | 40,00 | AIR |  |  |
| F6 | -470,00 | 2,00 |  | 40,00 | BK3 | 1,5001 | 64,90 |
| F7 | 37,00 | 2,80 |  | 40,00 | LAF9 | 1,8017 | 28,19 |
| F8 | 49,60 | 199,09 | 316,77 | 40,00 | AIR |  |  |

| Nr | Radius [mm] | Thickness 1 [mm] | Thickness 2 [mm] | Diameter [mm] | Medium | Refractive index at 546 mm | Abbe number |
|---|---|---|---|---|---|---|---|
| F1 | 87,50 | 4,00 | | 40,00 | CAF2 | 1,4349 | 94,46 |
| F2 | -215,00 | 0,20 | | 40,00 | AIR | | |
| F3 | 90,50 | 4,50 | | 40,00 | CAF2 | 1,4349 | 94,46 |
| F4 | -128,00 | 2,00 | | 40,00 | LAF9 | 1,8017 | 28,19 |
| F5 | -470,00 | 13,00 | 2,00 | 40,00 | AIR | | |
| F6 | -470,00 | 2,00 | | 40,00 | BK3 | 1,5001 | 64,90 |
| F7 | 37,00 | 2,80 | | 40,00 | LAF9 | 1,8017 | 28,19 |
| F8 | 49,60 | 199,20 | 316,09 | 40,00 | AIR | | |

VARIOSCOPE OPTICAL UNIT AND MICROSCOPE HAVING A VARIOSCOPE OPTICAL UNIT

BACKGROUND OF THE INVENTION

1. Field of the Invention

The present invention relates to a varioscope optical unit and to a microscope having such an optical unit.

2. Description of the Related Art

It is a requirement for many microscopy applications that the observation object that is observed using a microscope remains in the focus of the microscope when the working distance of the microscope from the observation object, also referred to as depth of field, changes. In order to achieve this, the focal length of the objective optical unit must be variable so as to be able to be adapted to the change in the working distance. In so-called varioscopes, this is achieved by way of an optical arrangement having a lens or lens group with a positive refractive power and a lens or lens group that is arranged on the object-side and has a negative refractive power, with one of the lenses or lens groups being arranged such that it is displaceable along the optical axis. A stereo microscope having a corresponding optical arrangement, in which the lens having a negative refractive power is arranged such that it is displaceable along the optical axis, is described, for example, in JP 11271625 A. In the arrangement described in JP 11271625 A, illumination light is coupled in below the negative member via a deflection mirror.

If the illumination radiation in a varioscope optical unit is intended to be coupled into the microscope beam path above the positive member, the lenses or lens groups of the varioscope optical unit have cutouts for the illumination radiation path, so that back-reflections of the illumination into the observer-side pupils of the microscope are avoided. However, Lenses and lens groups that have cutouts are comparatively expensive and generally permit illumination only under a relatively large illumination angle.

It is therefore an object of the present invention to provide a varioscope optical unit, in which a low-reflection illumination can be realized when coupling in the illumination light above the positive member, even without using lenses or a lens group with cutouts. A further object is to provide a microscope in which disturbing reflections are reduced for an illumination beam path that extends through the varioscope optical unit.

SUMMARY OF THE INVENTION

A varioscope optical unit according to the invention comprises a positive member, which is formed from a lens or lens group and has a positive refractive power, and a negative member, which is formed from a lens or lens group and has a negative refractive power. The positive member and the negative member are arranged along an optical axis such that the negative member is arranged to follow the positive member in an observation direction. In other words, the positive member is arranged on the image side, while the negative member is arranged on the object side. At least the positive member or at least the negative member is arranged such that it is displaceable along the optical axis, wherein the depth of field can be varied by displacing the positive member or the negative member. In the interest of a compact configuration of the varioscope optical unit, it is advantageous if the displacement travel of the positive member or of the negative member is at most 15 mm, in particular at most 12 mm. Typically, only the positive member or only the negative member is displaceable, although in principle it is also possible to configure both the positive member and the negative member to be displaceable.

The positive member has a first termination lens surface, which terminates the positive member counter to the observation direction, and a second termination lens surface, which terminates the positive member in the observation direction. Likewise, the negative member has a first termination lens surface, which terminates the negative member counter to the observation direction, and a second termination lens surface, which terminates the negative member in the observation direction. The second termination lens surface of the positive member and the first termination lens surface of the negative member are configured to be concave when viewed in the observation direction, whereas the second termination lens surface of the negative member is configured to be convex when viewed in the observation direction.

In the varioscope optical unit according to the invention, the second termination lens surface of the positive member and the first termination lens surface of the negative member each have a radius of curvature with an absolute value of at most 500 mm. The second termination lens surface of the negative member has a radius of curvature with an absolute value of at most 70 mm.

A varioscope optical unit of this type makes it possible in a microscope that is fitted therewith to guide the illumination through the varioscope optical unit without the need for using lenses or lens groups having cutouts in the varioscope optical unit. By way of the radii of curvature stated, back-reflections of the illumination at lens surfaces of the varioscope optical unit can be guided past the observer-side pupils of the microscope. Since there is no need for the lenses of the varioscope optical unit to have cutouts made, it is possible, in addition, to move the illumination beam path closer to the optical axis, which enables illumination with smaller illumination angles. Small illumination angles are advantageous in particular in surgical microscopes when they are intended to be used during operations which involve deep operating channels. However, illumination with illumination angles which are as small as possible is also advantageous in other microscopes which are intended for use for observing deep channels in an observation object.

To make correction of chromatic aberrations possible, the negative member can comprise a lens which is made up of a first lens element and a second lens element, wherein the negative member can also consist of only such a compound lens. The first lens element and the second lens element are arranged along the optical axis such that the second lens element follows the first lens element when viewed in the observation direction. The first termination lens surface of the negative member is formed in the first lens element. The lens elements are composed of different materials, with the first lens element being composed of a material with a refractive index of at most 1.6. This configuration makes it possible to correct chromatic aberrations without back-reflections of the illumination, which can occur for example at the interface between the two lens elements, being guided into the observer-side pupils. If the negative member consists of only the compound lens, the second termination lens surface of the negative member is formed in the second lens element.

With respect to avoiding the coupling of back-reflections into the observer-side pupils, it is further advantageous if the first termination lens surface of the positive member has a convex curvature, when viewed in the observation direction, with a radius of curvature with an absolute value of at most 130 mm.

In a further configuration of the varioscope optical unit, the positive member can comprise a first convex lens and a second convex lens, wherein the first convex lens and the second convex lens are arranged along the optical axis such that the second convex lens follows the first convex lens when viewed in the observation direction. The second termination lens surface of the positive member in this case is formed in the second convex lens. Furthermore, the first termination lens surface of the positive member can be formed in the first convex lens. In principle, further lenses may be present between the convex lenses. However, to achieve a compact construction of the varioscope optical unit it is advantageous if the positive member in the described configuration is composed only of the first convex lens and the second convex lens.

In a development of the configuration, in which the positive member comprises a first convex lens and a second convex lens, the second convex lens has a lens surface which terminates said second convex lens counter to the observation direction and has a convex curvature, when viewed in the observation direction, with a radius of curvature with an absolute value of at most 120 mm. In addition, the first convex lens can have a lens surface which terminates said first convex lens in the observation direction and has a concave curvature, when viewed in the observation direction, wherein the concave curvature has a radius of curvature with an absolute value of at most 450 mm.

The first or the second convex lens of the positive member can be made up of a first convex-lens element and a second convex-lens element, wherein the first convex-lens element and the second convex-lens element are arranged along the optical axis such that the second convex-lens element follows the first convex-lens element when viewed in the observation direction. In this configuration, the two convex-lens elements are made of different materials. The use of different materials makes it possible to reduce chromatic aberrations in the optical unit.

According to a second aspect of the invention, provision is made for a microscope having a varioscope optical unit according to the invention and an illumination beam path to be guided through the positive member and through the negative member of the varioscope optical unit. The microscope can be a stereo microscope, in particular a surgical microscope.

In the microscope according to the invention, owing to the use of the varioscope optical unit according to the invention, back-reflections of the illumination beam path guided through the positive member and the negative member into the observer-side pupils can be suppressed, without the need to use lenses or lens groups having cutouts therefor. The properties and advantages described in relation to the varioscope optical unit according to the invention can thus also be found in the microscope according to the invention. Guiding the illumination beam path through the lenses or lens groups of the varioscope optical unit without cutouts in the lenses or lens groups also enables the illumination beam path to be guided closer to the optical axis, such that smaller illumination angles can be realized as compared to varioscope optical units having cutouts.

Furthermore, guiding the illumination beam path through a varioscope optical unit without cutouts in the lenses or lens groups has the advantage that, even if the working distance changes, the centring of the luminous field with respect to the field of view is maintained without the need to subsequently correct the optical unit of the illumination group. Furthermore, the optical unit of the illumination group can be held more easily, because the varioscope optical unit can serve as part of the illumination optical unit. Dedicated optical elements in the illumination optical unit, which serve for adjusting the working distance for the illumination, can thus be omitted when the varioscope optical unit according to the invention is used. In particular, it is possible to use illumination devices as are applied for example in objectives with fixed focal lengths. The omission of dedicated optical elements for varying the working distance in the illumination device also makes possible a compact construction of the illumination optical unit, and as a result also of the microscope according to the invention.

Overall, the manufacturing costs both of the varioscope optical unit and of the illumination device—and thus the manufacturing costs of the microscope—can therefore be reduced as compared to microscopes with varioscope optical units according to the prior art.

Although back-reflections of the illumination radiation into the observer-side pupils in the microscope according to the invention can already largely be avoided by using the varioscope optical unit according to the invention, any remaining back-reflections can be suppressed by arranging a reflection stop in the illumination beam path. Here, the reflection stop can advantageously be arranged between an illumination light source and a first lens, which follows the illumination light source. It is particularly advantageous here if the reflection stop is arranged to be spaced apart from the light source by no more than 5 mm. If a Köhler illumination means is used for the illumination optical unit, the lens following the illumination light source is the collector for the Köhler illumination means. However, the reflection stop can also be arranged immediately in front of or behind a deflection element for deflecting the illumination beam path.

Suitable light sources are self-luminous light sources, such as incandescent lamps, arc lamps, luminescence emitters etc., or non-self-luminous light sources, such as for example the real image of a self-luminous light source or the exit end of an optical waveguide.

If the microscope is configured in the form of a stereo microscope, it has at least two observer-side pupils, which are arranged mirror-symmetrically with respect to an axis of symmetry. The reflection stop can then have in particular a stop aperture and a protrusion protruding into the stop aperture, which protrusion is arranged mirror-symmetrically with respect to an axis of symmetry of the stop. A projection of the axis of symmetry of the stop into the observer beam path runs at an angle of no more than ±3°, in particular no more than ±1°, with respect to the axis of symmetry of the observer-side pupils. It is also advantageous if the reflection stop is arranged such that it is rotatable about the optical axis of the illumination beam path such that the orientation axis of symmetry of the stop in the above-mentioned angular range, that is to say by ±3° or ±1°, can be varied. As a result, the orientation of the reflection stop can be adapted optimally to any remaining reflections.

Overall, the reflection stop screens out at most 20% of the area of the illumination ray pencil.

Further features, properties and advantages of the present invention result from the following description of exemplary embodiments with reference to the accompanying Figures.

DETAILED DESCRIPTION OF THE PREFERRED EMBODIMENTS

Figure 1:
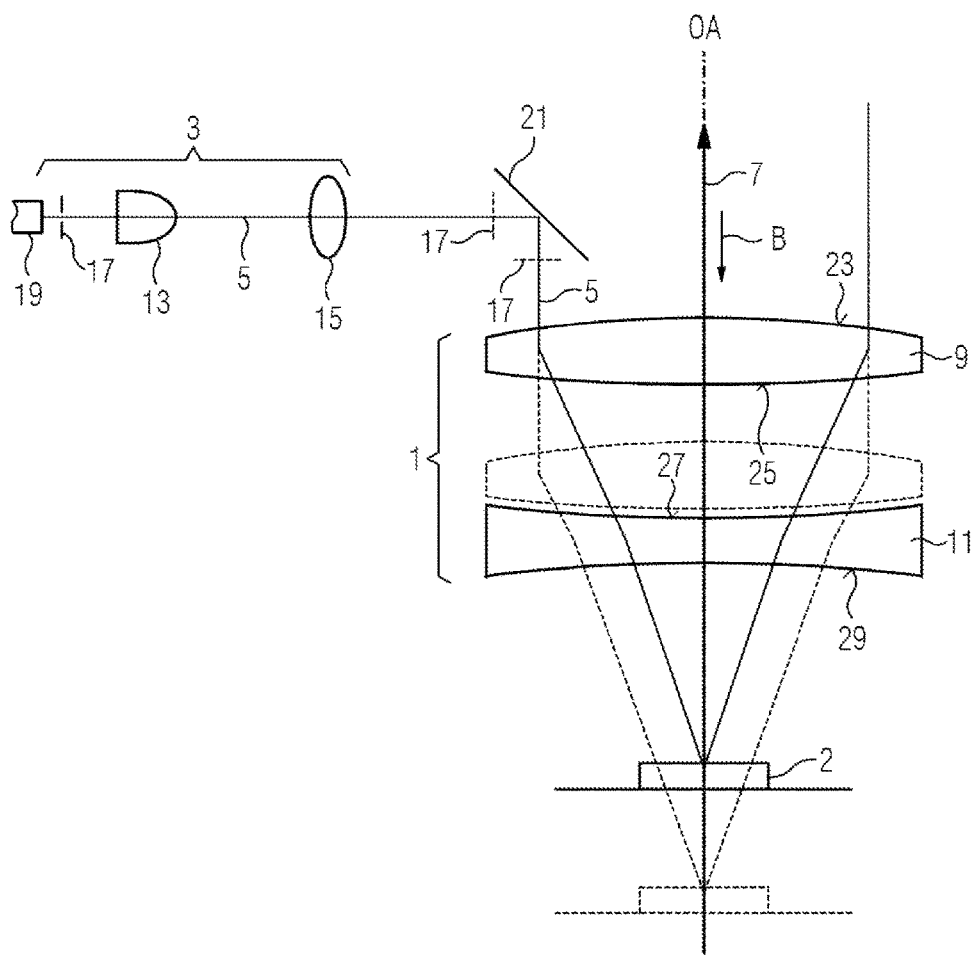
FIG. 1 shows a detail of a surgical microscope according to the invention having a varioscope optical unit.

A microscope according to the invention will be described below with reference to FIG. 1, which shows a schematic illustration of a detail of a surgical microscope. The illustrated detail shows the varioscope optical unit 1 of the surgical microscope, the illumination optical unit 3 of the surgical microscope, the illumination beam path 5 guided towards the observation object 2, and the observation channel 7 guided from the observation object 2 to the observer (not illustrated). The observation channel 7 runs parallel to the optical axis OA and comprises two stereoscopic subchannels which, in the view illustrated in FIG. 1, are located on a line of sight with the optical axis such that the associated partial beam paths cannot be seen individually in the present view.

In the observation channel, the varioscope optical unit is followed in the direction towards the observer (not illustrated) by a magnification changer, which can be configured in the form of a zoom system or as a Galilean changer. While in a zoom system at least three lenses arranged one behind the other along the optical axis are present, of which two are displaceable along the optical axis in order to achieve a continuously variable setting of the magnification factor, in a Galilean changer at least two fixed lens combinations are present, which can be inserted in alternation into the change of the magnification factor observation beam path in order to achieve a stepped magnification change. The respectively inserted lens combination then determines the magnification factor.

The magnification changer is followed in the direction towards the observer by a binocular tube (likewise not illustrated), which can be fitted with optical eyepieces for direct observation or with electronic eyepieces for indirect observation, for example using 3-D glasses.

Moreover, the surgical microscope can have interfaces for coupling beams into or out of the observation beam path. Such interfaces are typically configured in the form of partially transmitting elements, for example as beam splitter prisms. Cameras or superposition apparatuses for superposing images or data onto the observer beam path, for example, can be connected to the interfaces.

The varioscope optical unit 1 of the surgical microscope illustrated in FIG. 1 comprises a positive member, that is to say an optical element with a positive refractive power, which is illustrated schematically in FIG. 1 as a convex lens 9. The varioscope optical unit 1 additionally comprises a negative member, that is to say an optical element having a negative refractive power, which is illustrated schematically in FIG. 1 as a concave lens 11. The negative member 11 is, when viewed in the observation direction B, arranged downstream of the positive member 9, that is to say it is located between the positive member 9 and the observation object 2. Below, all specifications regarding the order in the arrangement of optical elements refer to the observation direction B, that is to say the optical elements are respectively specified in the direction from the observer to the observation object. The same is true where a lens surface is described as concave or convex. A lens surface which is convex when viewed in the observation direction has a positive radius of curvature with respect to the observation direction B, that is to say the particular surface curves towards the observer. A concave lens surface has, with respect to the observation direction B, a negative radius of curvature such that the particular surface curves towards the observation object 2.

In the illustrated exemplary embodiment, the negative member 11 is arranged in a fixed manner, whereas the positive member 9 is arranged such that it is displaceable along the optical axis OA. By displacing the positive member 9, the depth of field of the zoom optical unit can be varied, as is shown in dashed lines in FIG. 1. On the right-hand side of the varioscope optical unit, the change in the trajectory of an observation ray pencil is illustrated, while on the left-hand side of the varioscope optical unit it is the change in the trajectory of an illumination ray pencil. If the positive member 9 is displaced into the position indicated by dashed lines in FIG. 1, the depth of field increases and the working distance of the microscope from the observation object 2 changes.

Although the positive member 9 has a displaceable configuration in FIG. 1, it is also possible for the negative member 11 and not the positive member 9 to be arranged such that it is moveable along the optical axis. However, the negative member 11 frequently is the terminating lens of the microscope objective. A negative member which is fixed therefore has the advantage that the inside of the surgical microscope can be sealed off more easily with respect to external influences. It should further be noted that, even though the positive member 9 and the negative member 11 are illustrated in FIG. 1 merely as individual lenses, either of said members could also be realized in the form of a lens group rather than in the form of an individual lens. This becomes clear below in the context of the description of particular exemplary embodiments for the varioscope optical unit.

In the present exemplary embodiment, the illumination optical unit 3 of the surgical microscope is configured in the form of a Köhler optical unit. A Köhler optical unit comprises a collector 13, which is shown as an individual lens in the present exemplary embodiment, but can also be configured in the form of a lens combination. Instead of Köhler illumination, it is also possible to use other illumination principles.

The illumination optical unit 3 also comprises a reflection stop 17, whose meaning will be explained further below.

The light source in the present exemplary embodiment is the exit end of an optical waveguide 19. Instead of an optical-waveguide exit end, that is to say a non-self-luminous light source, it is, however, also possible for a self-luminous light source to be present, such as an incandescent lamp, a gas-discharge lamp or a luminescence emitter, in particular an electroluminescence emitter, such as for example an LED. However, the exit end of an optical waveguide has the advantage that the self-luminous light source, which must typically be cooled, can be arranged at a distance from the main body of the surgical microscope, so that vibrations that result from the cooling of the self-luminous light source by way of fans can be decoupled from the surgical microscope.

In the microscope according to the invention, the illumination beam path 5 is guided through the varioscope optical unit 1 by way of a deflection element 21, which can be configured for example as a deflection mirror or a deflection prism. The parameters of the varioscope optical unit are here chosen such that back-reflections at the lens surfaces of the varioscope optical unit do not pass into the observation pupils of the observation beam path.

In the context of the following description of the parameters of the varioscope optical unit, the following definitions will be used:

The lens surface which terminates the positive member 9 counter to the observation direction B, that is to say the lens surface 23 of the positive member which faces the observer, is considered to be the first termination lens surface 23 of the positive member.

The lens surface 25 which terminates the positive member 9 in the observation direction B, that is to say the lens surface which faces the observation object 2, is considered to be the second termination lens surface of the positive member 9.

The lens surface 27 which terminates the negative member 11 counter to the observation direction B, that is to say the lens surface which faces the observer, is considered to be the first termination lens surface of the negative member 11.

The lens surface 29 which terminates the negative member 11 in the observation direction B, that is to say the lens surface which faces the observation object 2, is considered to be the second termination lens surface 29 of the negative member 11.

Although the first termination lens surface and the second termination lens surface of the respective member are illustrated in FIG. 1 as belonging to the same lens, said surfaces can also belong to different lenses of a lens group forming the particular member.

In order to avoid back-reflections into the observer-side pupils of the observation beam path, the second termination lens surface 25 of the positive member 9 and the first termination lens surface 27 of the negative member 11, which both have a concave configuration when viewed in the observation direction, each have a radius of curvature with an absolute value of at most 500 mm. Typically, the radius of curvature of said termination lens surfaces is at least 300 mm, but can be less than that. The second termination lens surface 29 of the negative member 11, which is convex when viewed in the observation direction, has a radius of curvature with an absolute value of at most 70 mm. Typically, the radius of curvature will be less than 50 mm, although it can also be less than that.

If the negative member 11 is configured in the form of a cemented member made up of two lens elements, and the lens elements are composed of different materials, in particular different glasses, it is advantageous in the interest of avoiding back-reflections into the observer-side pupils of the observation beam path if the first lens element is composed of a material with a refractive index of at most 1.6. The lens element which faces the observer is here considered to be the first lens element, while the lens element which follows the first lens element when viewed in the observation direction, that is to say the lens element facing the observation object 2, is considered to be the second lens element.

In the present exemplary embodiment, it is advantageous in the interest of avoiding back-reflections if the first termination lens surface 23 of the positive member 9, which is convex when viewed in the observation direction, has a radius of curvature with an absolute value of at most 130 mm. However, this restriction is not absolutely necessary and is merely an advantageous option.

Concrete exemplary designs for the varioscope optical unit according to the invention are described below with reference to FIGS. 2 and 3.

Figures 2, 3:
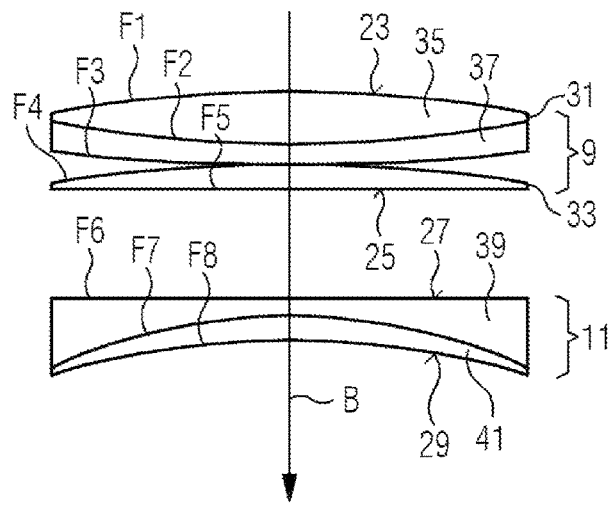
FIG. 2 shows a particular exemplary embodiment for a varioscope optical unit according to the invention.
FIG. 3 shows a table with the design parameters of the particular exemplary embodiment in FIG. 2.

FIG. 2 shows a first exemplary design for the varioscope optical unit according to the invention. In this exemplary design, the positive member 9 is configured in the form of a lens group with a first convex lens 31 and a second convex lens 33. In this case, the first convex lens 31 is configured in the form of a cemented member, which is made up of a first convex-lens element 35 and a second convex-lens element 37. The second convex-lens element follows the first convex-lens element 35 in the observation direction. Here, the term convex-lens element is not intended to mean that each of the lens elements that form the first convex lens 31 is configured in the form of a convex lens, but merely that the particular lens element is part of a convex lens. In fact, in the present exemplary embodiment, the second convex-lens element 37 is a diverging lens and is thus configured in the form of a concave lens.

In the lens group which forms the positive member 9, the first termination lens surface 23 of the positive member 9 is a lens surface of the first convex-lens element 35 in the first convex lens 31. The second termination lens surface of the positive member 9 is a lens surface of the second convex lens.

The negative member 11 is configured in the form of a cemented member, which is made up of a first lens element 39 and a second lens element 41, which follows the first lens element in the observation direction B. The first termination lens surface 27 of the negative member 11 is thus a lens surface of the first lens element 39, while the second termination lens surface 29 of the negative member 11 is a lens surface of the second lens element 41. The parameters of the individual lenses and of the lens surfaces F1 to F8 are given in the table in FIG. 3.

In the exemplary design illustrated in FIG. 2, either the positive member 9 or the negative member 11 can be configured such that it is moveable along the optical axis OA. In principle it is also possible for both members to be configured to be moveable along the optical axis OA. However, in this case a movement of the two members must also result in a relative movement of the two members. However, it is sufficient, and simpler from a construction point of view, if only one of the two members is moveably arranged.

Figures 4, 5:
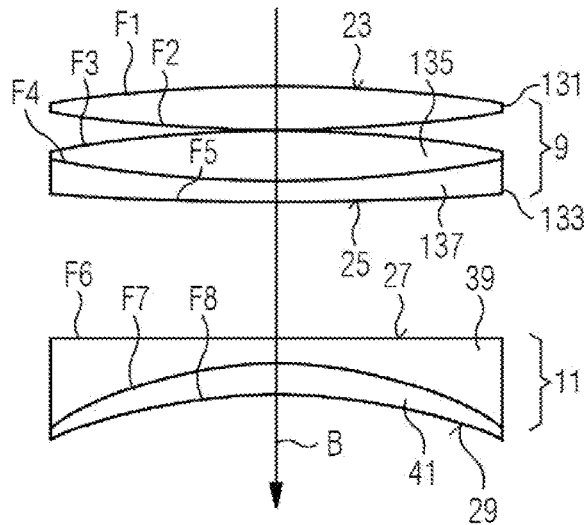
FIG. 4 shows an alternative particular exemplary embodiment for a varioscope optical unit according to the invention.
FIG. 5 shows a table with the design parameters of the particular exemplary embodiment in FIG. 4.

A second exemplary design for the varioscope optical unit according to the invention is illustrated in FIG. 4. In this case, the negative member 11 does not differ from the negative member of the exemplary design illustrated in FIG. 4. The difference between the exemplary design illustrated in FIG. 4 and the exemplary design illustrated in FIG. 2 lies in the positive member 9. As in the first exemplary design, the positive member 9 in the second exemplary design is configured in the form of a lens group with a first convex lens 131 and a second convex lens 133, with the second convex lens 133 being arranged such that it follows the first convex lens 131 in the observation direction B. Contrary to the first exemplary design, however, the second convex lens 133 is configured in the form of a cemented member, which is made up of a first convex-lens element 135 and a second convex-lens element 137. The first termination lens surface 23 is a lens surface of the first convex lens 133, while the second termination lens surface 25 is a lens surface of the second convex-lens element 137 in the second convex lens 133. The design parameters of the lenses and lens surfaces F1 to F8 of the second exemplary design are compiled in the table in FIG. 5.

As in the first exemplary design, the positive member 9 or the negative member 11 in the second exemplary design is also arranged such that it is displaceable along the optical axis. Here, too, it is again possible in principle for both members to be arranged such that they are moveable along the optical axis such that the movement of both members results in a relative movement between the two members.

If in the varioscope optical unit according to the invention the positive member 8, as in the exemplary designs described, is formed from a lens group with a first convex lens 31, 131 and a second convex lens 33, 133, it is advantageous in the interest of avoiding back-reflections into the observer-side pupils of the observation beam path if the second convex lens 33, 133 has a lens surface which terminates counter to the observation direction and has a concave curvature, when viewed in the observation direction, with a radius of curvature with an absolute value of at most 120 mm. In the first exemplary design, this would be the surface F4, in the second exemplary design it would be the surface F3. However, the described feature is merely optional and not absolutely necessary for realizing the invention.

It is furthermore advantageous in a positive member 9 which is made up of a lens group of two convex lenses if the first convex lens 31, 131 has a lens surface which terminates this lens in the observation direction and has a concave curvature with a radius of curvature with an absolute value of at most 450 mm. In the exemplary design 1, this would be the surface F3, in the exemplary design 2, this would be the surface F2. Here, too, this is merely an optional configuration, which is not absolutely necessary for realizing the present invention.

Although the varioscope optical unit according to the invention can be used to largely avoid back-reflections into the observation beam path, which reach the observer-side pupils, in particular if the optional design features are also realized, in extreme positions of the moveable member of the varioscope optical unit, for example, minor back-reflections into the observer-side pupils can still occur if no other measures are taken. In many cases, these back-reflections are acceptable, in particular when it is generally unlikely for the moveably member to assume the extreme position. However, in the present exemplary embodiment for a microscope according to the invention, a reflection stop 17 is arranged in the illumination beam path 3 (see FIG. 1) in order to eliminate even these back-reflections. Said reflection stop is arranged in the illumination beam path such that the illumination of the object is not significantly impaired.

Figure 6:
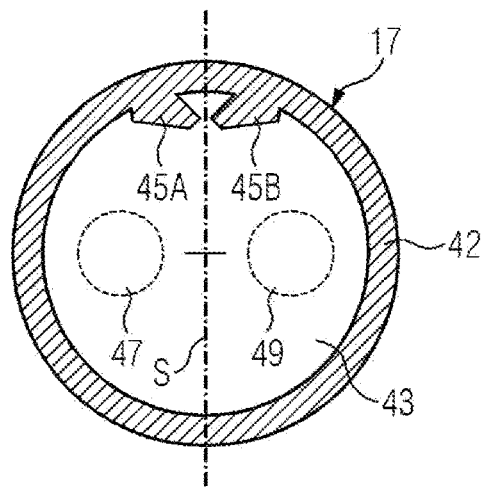
FIG. 6 shows a reflection stop for arrangement in the illumination beam path of a microscope.

One example of the configuration of the reflection stop is illustrated in FIG. 6.

The reflection stop 17 is configured in the form of a circular ring 42 having a central cutout 43, wherein two polygonal protrusions 45A, 45B protrude into a region of the central cutout 43. The protrusions are arranged symmetrically with respect to an axis of symmetry S (referred to below as the stop axis of symmetry) that is located in the stop plane. The projection of the stop axis of symmetry S into the observation beam path, which is indicated in FIG. 6 by the two observer-side pupils 47, 49, runs congruently with that axis of symmetry with respect to which the observer-side pupils 47, 49 are arranged mirror-symmetrically. However, for optimally masking any remaining reflections, it might make sense if the projection of the stop axis of symmetry encloses an angle with the axis of symmetry of the observer-side pupils. This angle is at most ±3°, typically at most ±1°. In order to set this angle, it is particularly advantageous if the reflection stop can be rotated by up to ±3° or ±1° about the optical axis of the illumination beam path. What was stated with respect to orientating the projection of the stop axis of symmetry S relating to the exemplary embodiment illustrated in FIG. 6 also applies correspondingly to the exemplary embodiments for the reflection stop which are described below with respect to FIGS. 7 and 8.

The reflection stop can be arranged in particular between the light source and the first lens of the illumination optical unit 3, which means between the optical-waveguide exit end 19 and the collector 13 in the present exemplary embodiment. Preferably it is spaced apart from the exit end of the optical waveguide or of the particular light source by no more than 5 mm. Alternative positions of the reflection stop are directly in front of or behind the deflection element 21, as indicated by dashed lines in FIG. 1.

The diameter of the central cutout 43 surrounded by the circular ring 42 is chosen such that it corresponds to the diameter of the illumination beam.

Figure 7:
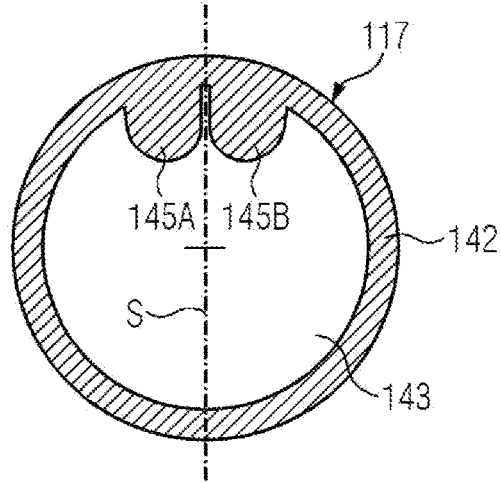
FIG. 7 shows an alternative configuration for the reflection stop.
Figure 8:
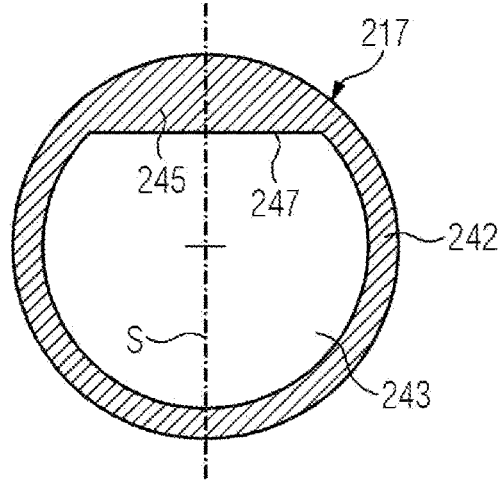
FIG. 8 shows yet another alternative configuration for the reflection stop.

Alternative embodiments of the reflection stop are illustrated in FIGS. 7 and 8. The reflection stop 117 in FIG. 7 differs from the reflection stop 17 in FIG. 6 in that the protrusions 145a, 145B extending from its circular ring 142 are not polygonal areas but are configured in the form of semicircles or partial ellipses.

In the configuration variant of the reflection stop 217 illustrated in FIG. 8, the protrusions extending from the circular ring are replaced by an area 245, which is delimited by a secant 247 of the circular ring 245.

In all reflection stops, the region for masking out the illumination radiation which protrudes into the central aperture is chosen such that in the luminous field, no more than 20% of the area of the illumination ray pencil is shaded out. In addition, the region is configured to be mirror-symmetrical with respect to the stop axis of symmetry S.

The microscope described with reference to exemplary embodiments, or the varioscope optical unit described with reference of exemplary embodiments, allow the illumination beam path to be guided through the varioscope optical unit without the need to provide cutouts herefor in the lenses of the varioscope optical unit. Back-reflections into the observer-side pupils are avoided by way of specially selecting the optics parameters of the varioscope optical unit. Any still remaining back-reflections into the observer-side pupils can be eliminated by a reflection stop.

Although the invention has been described with reference to particular exemplary embodiments, it is possible to deviate from the exemplary embodiments, which are described merely for illustration purposes. For example, the varioscope optical unit does not need to be integrated in a microscope. Rather, it can be configured as an autonomous unit, which can be exchanged, for example, for a microscope main objective of fixed focal length. The invention is therefore not intended to be limited by the particular exemplary embodiments but only by the appended claims.

What is claimed is:

1. A microscope comprising: a varioscope optical unit having a positive member that is formed from a lens or lens group and has a positive refractive power, and a negative member that is formed from a lens or lens group and has a negative refractive power, the positive member and the negative member being arranged along an optical axis, the microscope further comprising an illumination optical unit with a light source that directs light along an illumination beam path through the varioscope optical unit at an angle to the optical axis of the varioscope optical unit and to an observation object, wherein the illumination beam path is asymmetrically coupled into the varioscope optical unit such that the illumination beam path runs asymmetrically through the positive member and the negative member where the positive member is displaceable relative to the negative member other along the optical axis;

the positive member and the negative member are arranged along the optical axis such that the negative member is arranged in a fixed manner between the positive member and the observation object when viewed in an observation direction, at least one of the positive member and the negative member is displaceable along the optical axis, wherein a depth of field can be varied by displacing the positive member or the negative member, the positive member has a first termination lens surface that terminates the positive member counter to the observation direction, and a second termination lens surface that terminates the positive member in the observation direction, the negative member has a first termination lens surface that terminates the negative member counter to the observation direction, and a second termination lens surface that terminates the negative member in the observation direction, the second termination lens surface of the positive member and the first termination lens surface of the negative member are concave when viewed in the observation direction, and the second termination lens surface of the negative member is convex when viewed in the observation direction, the second termination lens surface of the positive member and the first termination lens surface of the negative member each have a radius of curvature with an absolute value of at most 500 mm, and the second termination lens surface of the negative member has a radius of curvature with an absolute value of at most 70 mm, and the first termination lens surface of the negative member is formed in a first lens element, the first lens element being composed of a material with a refractive index of at most 1.6.

2. The microscope of claim 1, wherein the negative member comprises a lens made up of a first lens element and a second lens element, the first lens element and the second lens element are arranged along the optical axis such that the second lens element follows the first lens element when viewed in the observation direction, the first termination lens surface of the negative member is formed in the first lens element, and the lens elements are composed of different materials, with the first lens element being composed of a material with a refractive index of at most 1.6.

3. The microscope of claim 2, wherein the second termination lens surface of the negative member is formed in the second lens element.

4. The microscope of claim 1, wherein the first termination lens surface of the positive member has a convex curvature, when viewed in the observation direction, with a radius of curvature with an absolute value of at most 130 mm.

5. The microscope of claim 1, wherein the positive member comprises a first convex lens and a second convex lens, wherein the first convex lens and the second convex lens are arranged along the optical axis such that the second convex lens follows the first convex lens when viewed in the observation direction and the second termination lens surface of the positive member is formed in the second convex lens.

6. The microscope of claim 5, wherein the first termination lens surface of the positive member is formed in the first convex lens.

7. The microscope of claim 5, wherein the second convex lens has a lens surface that terminates said second convex lens counter to the observation direction and has a convex curvature, when viewed in the observation direction, with a radius of curvature with an absolute value of at most 120 mm.

8. The microscope of claim 5, wherein the first convex lens has a lens surface that terminates said first convex lens in the observation direction and has a concave curvature, when viewed in the observation direction, with a radius of curvature with an absolute value of at most 450 mm.

9. The microscope of claim 5, wherein the first or the second convex lens is made up of a first convex-lens element and a second convex-lens element, wherein the first convex-lens element and the second convex-lens element are arranged along the optical axis (OA) such that the second convex-lens element follows the first convex-lens element when viewed in the observation direction, wherein the two convex-lens elements are composed of different materials.

10. The microscope of claim 1, wherein the illumination optical unit further includes a reflection stop arranged in the illumination beam path.

11. The microscope of claim 10, wherein the reflection stop is arranged between an illumination light source and a lens that follows the illumination light source.

12. The microscope of claim 11, wherein the reflection stop is spaced apart from the light source by no more than 5 mm.

13. The microscope of claim 10, wherein the reflection stop is arranged directly in front of or behind a deflection element for deflecting the illumination beam path toward the varioscope optical unit.

14. The microscope of claim 10, wherein the microscope is a stereomicroscope having two observer-side pupils arranged mirror-symmetrically with respect to an axis of symmetry, and the reflection stop has a stop aperture, a stop axis of symmetry and at least one protrusion arranged mirror-symmetrically with respect to the stop axis of symmetry so that the protrusion protrudes into the stop aperture.

15. The microscope of claim 14, wherein the reflection stop can be rotated by up to ±3 degrees about the optical axis of the illumination beam path within a plane that runs perpendicular to the optical axis of the illumination beam path.

16. The microscope of claim 14, wherein the reflection stop makes up at most 20% of the area of the illumination ray pencil.

17. The microscope of claim 10, wherein the reflection stop makes up at most 20% of the area of the illumination ray pencil.

* * * * *